United States Patent
Lei

(10) Patent No.: US 9,432,078 B2
(45) Date of Patent: Aug. 30, 2016

(54) METHOD AND DEVICE FOR SEARCHING CELL

(71) Applicant: ZTE Corporation, Shenzhen (CN)

(72) Inventor: Hui Lei, Shenzhen (CN)

(73) Assignee: ZTE MICROELECTRONICS TECHNOLOGY CO. LTD, Shenzhen (CN)

(*) Notice: Subject to any disclaimer, the term of this patent is extended or adjusted under 35 U.S.C. 154(b) by 0 days.

(21) Appl. No.: 14/654,634

(22) PCT Filed: Oct. 22, 2013

(86) PCT No.: PCT/CN2013/085716
§ 371 (c)(1),
(2) Date: Jun. 22, 2015

(87) PCT Pub. No.: WO2014/094491
PCT Pub. Date: Jun. 26, 2014

(65) Prior Publication Data
US 2015/0311947 A1  Oct. 29, 2015

(30) Foreign Application Priority Data
Dec. 21, 2012  (CN) .......... 2012 1 0562655

(51) Int. Cl.
H04B 1/7073 (2011.01)
H04J 13/00 (2011.01)
H04B 1/7083 (2011.01)
H04W 72/04 (2009.01)

(52) U.S. Cl.
CPC ........ *H04B 1/70735* (2013.01); *H04B 1/7083* (2013.01); *H04J 13/0003* (2013.01); *H04W 72/0446* (2013.01); *H04B 2201/7073* (2013.01); *H04J 2013/0096* (2013.01)

(58) Field of Classification Search
None
See application file for complete search history.

(56) References Cited

U.S. PATENT DOCUMENTS

| 2008/0167052 A1* | 7/2008 | Wang | H04J 11/0069 455/456.6 |
| 2009/0061864 A1 | 3/2009 | Sohn | |
| 2015/0087301 A1* | 3/2015 | Choudhary | H04W 48/16 455/434 |

FOREIGN PATENT DOCUMENTS

| CN | 1433171 A | 7/2003 |
| CN | 1433173 A | 7/2003 |

OTHER PUBLICATIONS

International Search Report for corresponding application PCT/CN2013/085716 filed Oct. 22, 2013; Mail date Jan. 30, 2014.

* cited by examiner

*Primary Examiner* — Kimberly A Williams
(74) *Attorney, Agent, or Firm* — Cantor Colburn LLP

(57) ABSTRACT

Provided are a method and device for searching a cell, and the method comprises: timeslot synchronization is performed; a primary scrambling code group is identified and a frame synchronization is performed according to hashed values of code numbers of secondary synchronization codes (SSCs) in any several consecutive timeslots; and a primary scrambling code is obtained in the primary scrambling code group according to the primary scrambling code group, so as to complete cell searching.

12 Claims, 2 Drawing Sheets

METHOD AND DEVICE FOR SEARCHING CELL

TECHNICAL FIELD

The disclosure relates to the technical field of communications, and in particular to a method and device for searching a cell.

BACKGROUND

A Wideband Code Division Multiple Access (WCDMA) system is an inter-base-station asynchronous system, and User Equipment (UE) needs to keep synchronous with the system in order to acquire the service of the system. The UE acquires information such as timeslot synchronization, frame synchronization, scrambling code group number and primary scrambling code by the cell searching process, so as to complete cell initial synchronization, and demodulates two channels, i.e. a Common Pilot Channel (CPICH) and a Broadcast Channel (BCH) according to the synchronization information to complete the related measurement of the cell and reading information of the cell system, so as to reside in an appropriate cell.

In a WCDMA system, a solution of three-step search is generally used to realize the cell searching. In the first step, basic synchronization information is captured, and information about a Primary Synchronous Channel (P-SCH) is used to complete timeslot synchronization; in the second step, a secondary synchronous channel (S-SCH) is captured and used to complete frame synchronization and identify information about a scrambling code group; and in the third step, a primary common control physical channel is captured, and the pattern feature of an intra-frame scrambling code is used to determine a scrambling code used by the local cell. Frame synchronization is the second step of cell searching, is used for realizing capturing a secondary synchronization channel on the basis of obtaining the timeslot synchronization and obtains the frame synchronization and scrambling code group number so as to provide a time reference for the scrambling code identification in the third step of the cell searching.

In the current existing solution, correlated characteristics are mainly used to acquire a Secondary Synchronization Code (SSC) of each timeslot, and the pattern of the code, which is formed by the SSCs of the timeslots in one frame, is used to be related to the 64 groups of primary scrambling codes, so as to determine a primary scrambling code group and frame synchronization. This solution and related simplified solutions all need a lot of relevant calculations, the consumption of storage and hardware operation is relatively large, and it requires at least one frame to find frame synchronization and identify the primary scrambling code.

SUMMARY

The disclosure provides a method and device for searching a cell, so as to solve the problem of complex calculation and large consumption in related art.

For solving the above-mentioned technical problem, on one aspect, a method for searching a cell is provided in the disclosure and the method comprises: performing timeslot synchronization; identifying a primary scrambling code group and performing frame synchronization according to hashed values of code numbers of Secondary Synchronization Codes (SSCs) in any several consecutive timeslots; and obtaining a primary scrambling code in the primary scrambling code group according to the primary scrambling code group, so as to complete cell searching.

Preferably, a Primary Synchronization Code (P-SCH) is used for capturing the primary synchronisation code by matching a peak value of a filtered output signal to determine a timeslot boundary, so as to complete timeslot synchronization.

Preferably, identifying the primary scrambling code group and performing frame synchronization according to the hashed values of code numbers of SSCs in any several consecutive timeslots comprises:

obtaining code numbers of the SSCs in any five consecutive timeslots, which are marked as $C_P$, P=0, 1, 2, 3, 4; recording the $C_P$, P=0, 1, 2, 3, 4 as $F_k=(C_k, C_{k+1}, C_{k+2})$ k=0, 1, 2, when k=0, a hashed value $F_0$ is calculated according to a hash formula;

judging whether or not there is a value $D_{i,j}$ which is equal to $F_0$ in a lookup table D obtained in advance by calculating according to the hash formula; if yes, determining that the primary scrambling code group number is i and $C_k$ actually represents the $(j \times 3)^{th}$ timeslot of one frame, so as to complete the scrambling code group identification and frame synchronization process; if no, calculating a hashed value $F_1$ when k=1 by the hash formula and further judging whether or not there is a value $D_{i,j}$ which is equal to $F_1$ in the lookup table D; if yes, determining that the primary scrambling code group number is i and $C_k$ actually represents the $(j \times 3+1)^{th}$ timeslot of one frame, so as to complete the scrambling code group identification and frame synchronization process; if no, calculating a hashed value $F_2$ when k=2 by the hash formula and finally judging whether or not there is a value $D_{i,j}$ which is equal to $F_2$ in the lookup table D; if yes, determining that the primary scrambling code group number is i and $C_k$ actually represents the $(j \times 3+2)^{th}$ timeslot of one frame, so as to complete the scrambling code group identification and frame synchronization process; if no, ending a flow.

Preferably, obtaining the lookup table D in advance by calculating according to the hash formula comprises:

dividing the SSCs in 64 rows and 15 columns into 64×5 groups in a manner of dividing the columns into 5 groups by forming every three columns into one group, obtaining a numerical value $D_{i,j}$ by calculating the code numbers of SSCs in each group according to the hash formula, and accordingly obtaining a lookup table D with 64×5.

Preferably, the hash formula is $$D_{i,j} = \alpha \cdot g_{i,j\cdot3+0} + \beta \cdot g_{i,j\cdot3+1} + \delta \cdot g_{i,j\cdot3+2}, i=0, \ldots, 63, j=0, \ldots, 4;$$

where i represents the primary scrambling code group number, j represents the $j^{th}$ hash in each primary scrambling code group, $g_{i,j\cdot3+0}$ represents the code number of the SSC corresponding to the $j \cdot 3+0^{th}$ timeslot in the $i^{th}$ scrambling code group in the table, and $\alpha$, $\beta$, and $\delta$ are coefficients.

On another aspect, a device for searching a cell is further provided in the disclosure, comprising:

a timeslot synchronization component, configured to perform timeslot synchronization; a primary scrambling code group identification and frame synchronization component configured to identify a primary scrambling code group and perform frame synchronization according to hashed values of code numbers of secondary synchronization codes (SSCs) in any several consecutive timeslots; and a cell searching component configured to obtain a primary scrambling code in the primary scrambling code group according to the primary scrambling code group, so as to complete cell searching.

Preferably, the synchronization component uses a Primary Synchronization Code (P-SCH) to capture a primary synchronisation code by matching a peak value of a filtered output signal to determine a timeslot boundary, so as to complete timeslot synchronization.

Preferably, the primary scrambling code group identification and frame synchronization component is configured to obtain code numbers of the SSCs in any five consecutive timeslots, which are marked as $C_P$, P=0, 1, 2, 3, 4; record the $C_P$, P=0, 1, 2, 3, 4 as $F_k=(C_k, C_{k+1}, C_{k+2})$ k=0, 1, 2, wherein when k=0, a hashed value $F_0$ is calculated according to a hash formula; and judge whether or not there is a value $D_{i,j}$ which is equal to $F_0$ in a lookup table D obtained in advance by calculating according to the hash formula; if yes, determine that the primary scrambling code group number is i and $C_k$ actually represents the $(j\times3)^{th}$ timeslot of one frame, so as to complete the scrambling code group identification and frame synchronization process; if no, calculate a hashed value $F_1$ when k=1 by the hash formula and further judge whether or not there is a value $D_i,j$ which is equal to $F_1$ in the lookup table D; if yes, determine that the primary scrambling code group number is i and $C_k$ actually represents the $(j\times3+1)^{th}$ timeslot of one frame, so as to complete the scrambling code group identification and frame synchronization process; if no, calculate a hashed value $F_2$ when k=2 by the hash formula and finally judge whether or not there is a value $D_{i,j}$ which is equal to $F_2$ in the lookup table D; if yes, determine that the primary scrambling code group number is i and $C_k$ actually represents the $(j\times3+2)^{th}$ timeslot of one frame, so as to complete the scrambling code group identification and frame synchronization process; if no, end.

Preferably, the primary scrambling code group identification and frame synchronization component is configured to:

divide the SSCs in 64 rows and 15 columns into 64×5 groups in a manner of dividing the columns into 5 groups by forming every three columns into one group, obtain a numerical value $D_{i,j}$ by calculating the SSC code numbers in each group according to the hash formula, and accordingly obtain the lookup table D with 64×5.

Preferably, the hash formula is:

$$D_{i,j}=\alpha \cdot g_{i,j\cdot 3+0}+\beta \cdot g_{i,j\cdot 3+1}+\delta \cdot g_{i,j\cdot 3+2}, i=0,\ldots,63, j=0,\ldots,4;$$

where i represents the primary scrambling code group number in the table, j represents the $j^{th}$ hash in each primary scrambling code group, $g_{i,j\cdot 3+0}$ represents the code number of the SSC corresponding to the $j\cdot 3+0^{th}$ timeslot in the $i^{th}$ scrambling code group in the table, and α, β, and δ are coefficients.

The disclosure has the advantages as follows:

In the disclosure, possible SSC of each timeslot is determined, and then, a scrambling code group is searched for through a hash method, so that the problem of complex calculation and large storage in processes of frame synchronization and identification of a primary scrambling code group in cell searching in related art is solved, and the processes of identification of a scrambling code group and frame synchronization may be completed as long as hashed values of code numbers of SSCs of several consecutive timeslots are calculated; and the amount of related calculation is reduced by about two times, and the process of frame synchronization is accelerated.

DESCRIPTION OF THE ACCOMPANYING DRAWINGS

DETAILED DESCRIPTION OF THE EMBODIMENTS

In the following, the disclosure will be described in further detail with combination of the accompanying drawings and the embodiments. It should be understood that specific embodiments described here are only used for illustrating the disclosure and not intended to limit the disclosure.

Figure 1:
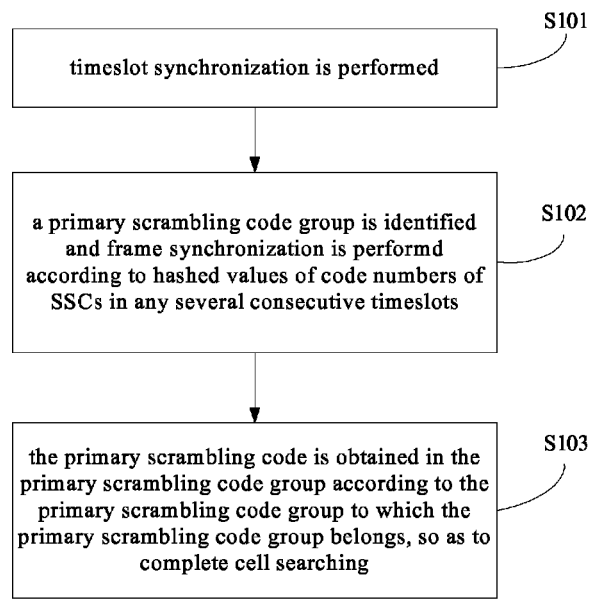
FIG. 1 is a flowchart of a cell searching method in an embodiment of the disclosure.

As shown in FIG. 1, an embodiment of the disclosure provides a method for searching a cell, and the method comprises the following steps.

In Step S101, timeslot synchronization is performed.

A Primary Synchronization Channel (P-SCH) which has no spread spectrum and scrambling dealing is used. The P-SCH repeatedly sends the primary synchronisation code with 256 chips at the starting position of each timeslot, and there is only one primary synchronisation code for all the cells in the overall system. A terminal knows the chip sequence thereof in advance, the primary synchronisation code is captured by matching a peak value of a filtered output signal to determine a timeslot boundary, so as to complete timeslot synchronization.

Figure 2:
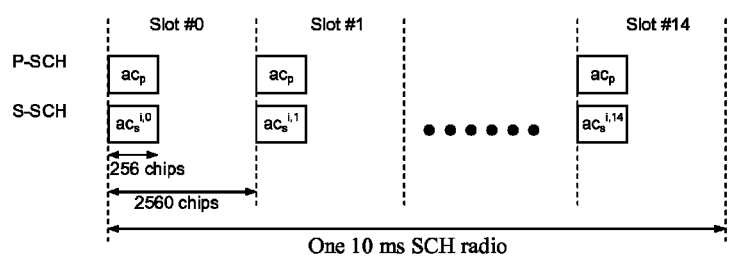
FIG. 2 is a structure diagram of a synchronization channel (SCH) in an embodiment of the disclosure.

A Sync Channel (SCH) is a down link signal for cell search, and the SCH comprises two sub-channels, i.e. a primary synchronization channel (P-SCH) and a secondary synchronization channel (S-SCH). The frame structure of the SCH is as shown in FIG. 2. The P-SCH comprises a modulation code of which the length is 256 chips, a Primary Synchronization Code (PSC), which is represented by Cp in FIG. 2 and is transmitted once at each timeslot. The PSCs of each cell in the system are the same. The S-SCH repeatedly transmits a modulation code having 15 sequences, and the length of each modulation code is 256 chips. The SSC and the primary SCH are transmitted in parallel. Each SSC is a code selected from 16 different codes of the length of which is 256 chips and is sent repeatedly in a unit of frame.

In step S102, a primary scrambling code group is identified and frame synchronization is performed according to hashed values of code numbers of SSCs in any several consecutive timeslots.

The step S101 comprises the following steps.

In the step S1021, the SSCs in 64 rows and 15 columns in table 1 are divided into 64×5 groups in a manner of dividing the columns into 5 groups by forming every three columns into one group. A numerical value $D_{i,j}$ and a lookup table D with 64*5 are obtained by calculating the code numbers of the SSCs in each group according to a hash formula, wherein the hash formula is $$D_{i,j}=\alpha \cdot g_{i,j\cdot 3+0}+\beta \cdot g_{i,j\cdot 3+1}+\delta \cdot g_{i,j\cdot 3+2}, i=0,\ldots,63, j=0,\ldots,4;$$

where i represents the primary scrambling code group number in the table, j represents the $j^{th}$ hash in each primary scrambling code group, $g_{i,j\cdot 3+0}$ represents the code number of the SSC corresponding to the $j\cdot 3+0^{th}$ timeslot in the $i^{th}$ scrambling code group in the table. Considering that any three consecutive sequences are unique characteristics in table 1, and the coefficients α, β, and δ may be determined by method such as simulation and test, so that all the $D_{i,j}$ are different. The constitution of 64 standby SCH code sequences enables their cyclic shifts to be unique, that is to say, any non-zero cyclic shift which is less than 15 in the 64 code sequences is not equal to the cyclic shift of other 64 sequences. Furthermore, any non-zero cyclic shift which is less than 15 is not equal to the cyclic shift which is less than 15 in other sequences. Table 1 describes an SSC sequence which is used for coding 64 scrambling codes. Values in table 1 represent the SSCs used for different timeslots and different scrambling code groups. That is to say, "7" represents SSC Cssc, wherein 7 should be used to corresponding scrambling code group and timeslot.

TABLE 1

SSC distribution for standby SCH codes

| Scrambling code group | Timeslot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Code group 1 | 1 | 1 | 2 | 8 | 9 | 10 | 15 | 8 | 10 | 16 | 2 | 7 | 15 | 7 | 16 |
| Code group 2 | 1 | 1 | 5 | 16 | 7 | 3 | 14 | 16 | 3 | 10 | 5 | 12 | 14 | 12 | 10 |
| Code group 3 | 1 | 2 | 1 | 15 | 5 | 5 | 12 | 16 | 6 | 11 | 2 | 16 | 11 | 15 | 12 |
| Code group 4 | 1 | 2 | 3 | 1 | 8 | 6 | 5 | 2 | 5 | 8 | 4 | 4 | 6 | 3 | 7 |
| Code group 5 | 1 | 2 | 16 | 6 | 6 | 11 | 15 | 5 | 12 | 1 | 15 | 12 | 16 | 11 | 2 |
| Code group 6 | 1 | 3 | 4 | 7 | 4 | 1 | 5 | 5 | 3 | 6 | 2 | 8 | 7 | 6 | 8 |
| Code group 7 | 1 | 4 | 11 | 3 | 4 | 10 | 9 | 2 | 11 | 2 | 10 | 12 | 12 | 9 | 3 |
| Code group 8 | 1 | 5 | 6 | 6 | 14 | 9 | 10 | 2 | 13 | 9 | 2 | 5 | 14 | 1 | 13 |
| Code group 9 | 1 | 6 | 10 | 10 | 4 | 11 | 7 | 13 | 16 | 11 | 13 | 6 | 4 | 1 | 16 |
| Code group 10 | 1 | 6 | 13 | 2 | 14 | 2 | 6 | 5 | 5 | 13 | 10 | 9 | 1 | 14 | 10 |
| Code group 11 | 1 | 7 | 8 | 5 | 7 | 2 | 4 | 3 | 8 | 3 | 2 | 6 | 6 | 4 | 5 |
| Code group 12 | 1 | 7 | 10 | 9 | 16 | 7 | 9 | 15 | 1 | 8 | 16 | 8 | 15 | 2 | 2 |
| Code group 13 | 1 | 8 | 12 | 9 | 9 | 4 | 13 | 16 | 5 | 1 | 13 | 5 | 12 | 4 | 8 |
| Code group 14 | 1 | 8 | 14 | 10 | 14 | 1 | 15 | 15 | 8 | 5 | 11 | 4 | 10 | 5 | 4 |
| Code group 15 | 1 | 9 | 2 | 15 | 15 | 16 | 10 | 7 | 8 | 1 | 10 | 8 | 2 | 16 | 9 |
| Code group 16 | 1 | 9 | 15 | 6 | 16 | 2 | 13 | 14 | 10 | 11 | 7 | 4 | 5 | 12 | 3 |
| Code group 17 | 1 | 10 | 9 | 11 | 15 | 7 | 6 | 4 | 16 | 5 | 2 | 12 | 13 | 3 | 14 |
| Code group 18 | 1 | 11 | 14 | 4 | 13 | 2 | 9 | 10 | 12 | 16 | 8 | 5 | 3 | 15 | 6 |
| Code group 19 | 1 | 12 | 12 | 13 | 14 | 7 | 2 | 8 | 14 | 2 | 1 | 13 | 11 | 8 | 11 |
| Code group 20 | 1 | 12 | 15 | 5 | 4 | 14 | 3 | 16 | 7 | 8 | 6 | 2 | 10 | 11 | 13 |
| Code group 21 | 1 | 15 | 4 | 3 | 7 | 6 | 10 | 13 | 12 | 5 | 14 | 16 | 8 | 2 | 11 |
| Code group 22 | 1 | 16 | 3 | 12 | 11 | 9 | 13 | 5 | 8 | 2 | 14 | 7 | 4 | 10 | 15 |
| Code group 23 | 2 | 2 | 5 | 10 | 16 | 11 | 3 | 10 | 11 | 8 | 5 | 13 | 3 | 13 | 8 |
| Code group 24 | 2 | 2 | 12 | 3 | 15 | 5 | 8 | 3 | 5 | 14 | 12 | 9 | 8 | 9 | 14 |
| Code group 25 | 2 | 3 | 6 | 16 | 12 | 16 | 3 | 13 | 13 | 6 | 7 | 9 | 2 | 12 | 7 |
| Code group 26 | 2 | 3 | 8 | 2 | 9 | 15 | 14 | 3 | 14 | 9 | 5 | 5 | 15 | 8 | 12 |
| Code group 27 | 2 | 4 | 7 | 9 | 5 | 4 | 9 | 11 | 2 | 14 | 5 | 14 | 11 | 16 | 16 |
| Code group 28 | 2 | 4 | 13 | 12 | 12 | 7 | 15 | 10 | 5 | 2 | 15 | 5 | 13 | 7 | 4 |
| Code group 29 | 2 | 5 | 9 | 9 | 3 | 12 | 8 | 14 | 15 | 12 | 14 | 5 | 3 | 2 | 15 |
| Code group 30 | 2 | 5 | 11 | 7 | 2 | 11 | 9 | 4 | 16 | 7 | 16 | 9 | 14 | 14 | 4 |
| Code group 31 | 2 | 6 | 2 | 13 | 3 | 3 | 12 | 9 | 7 | 16 | 6 | 9 | 16 | 13 | 12 |
| Code group 32 | 2 | 6 | 9 | 7 | 7 | 16 | 13 | 3 | 12 | 2 | 13 | 12 | 9 | 16 | 6 |
| Code group 33 | 2 | 7 | 12 | 15 | 2 | 12 | 4 | 10 | 13 | 15 | 13 | 4 | 5 | 5 | 10 |
| Code group 34 | 2 | 7 | 14 | 16 | 5 | 9 | 2 | 9 | 16 | 11 | 11 | 5 | 7 | 4 | 14 |
| Code group 35 | 2 | 8 | 5 | 12 | 5 | 2 | 14 | 14 | 8 | 15 | 3 | 9 | 12 | 15 | 9 |
| Code group 36 | 2 | 9 | 13 | 4 | 2 | 13 | 8 | 11 | 6 | 4 | 6 | 8 | 15 | 15 | 11 |
| Code group 37 | 2 | 10 | 3 | 2 | 13 | 16 | 8 | 10 | 8 | 13 | 11 | 11 | 16 | 3 | 5 |
| Code group 38 | 2 | 11 | 15 | 3 | 11 | 6 | 14 | 10 | 15 | 10 | 6 | 7 | 7 | 14 | 3 |
| Code group 39 | 2 | 16 | 4 | 5 | 16 | 14 | 7 | 11 | 4 | 11 | 14 | 9 | 9 | 7 | 5 |
| Code group 40 | 3 | 3 | 4 | 6 | 11 | 12 | 13 | 6 | 12 | 14 | 4 | 5 | 13 | 5 | 14 |
| Code group 41 | 3 | 3 | 6 | 5 | 16 | 9 | 15 | 5 | 9 | 10 | 6 | 4 | 15 | 4 | 10 |
| Code group 42 | 3 | 4 | 5 | 14 | 4 | 6 | 12 | 13 | 5 | 13 | 6 | 11 | 11 | 12 | 14 |
| Code group 43 | 3 | 4 | 9 | 16 | 10 | 4 | 16 | 15 | 3 | 5 | 10 | 5 | 15 | 6 | 6 |
| Code group 44 | 3 | 4 | 16 | 10 | 5 | 10 | 4 | 9 | 9 | 16 | 15 | 6 | 3 | 5 | 15 |
| Code group 45 | 3 | 5 | 12 | 11 | 14 | 5 | 11 | 13 | 3 | 6 | 14 | 6 | 13 | 4 | 4 |
| Code group 46 | 3 | 6 | 4 | 10 | 6 | 5 | 9 | 15 | 4 | 15 | 5 | 16 | 16 | 9 | 10 |
| Code group 47 | 3 | 7 | 8 | 8 | 16 | 11 | 12 | 4 | 15 | 11 | 4 | 7 | 16 | 3 | 15 |
| Code group 48 | 3 | 7 | 16 | 11 | 4 | 15 | 3 | 15 | 11 | 12 | 12 | 4 | 7 | 8 | 16 |
| Code group 49 | 3 | 8 | 7 | 15 | 4 | 8 | 15 | 12 | 3 | 16 | 4 | 16 | 12 | 11 | 11 |
| Code group 50 | 3 | 8 | 15 | 4 | 16 | 4 | 8 | 7 | 7 | 15 | 12 | 11 | 3 | 16 | 12 |
| Code group 51 | 3 | 10 | 10 | 15 | 16 | 5 | 4 | 6 | 16 | 4 | 3 | 15 | 9 | 6 | 9 |
| Code group 52 | 3 | 13 | 11 | 5 | 4 | 12 | 4 | 11 | 6 | 6 | 5 | 3 | 14 | 13 | 12 |
| Code group 53 | 3 | 14 | 7 | 9 | 14 | 10 | 13 | 8 | 7 | 8 | 10 | 4 | 4 | 13 | 9 |
| Code group 54 | 5 | 5 | 8 | 14 | 16 | 13 | 6 | 14 | 13 | 7 | 8 | 15 | 6 | 15 | 7 |
| Code group 55 | 5 | 6 | 11 | 7 | 10 | 8 | 5 | 8 | 7 | 12 | 12 | 10 | 6 | 9 | 11 |
| Code group 56 | 5 | 6 | 13 | 8 | 13 | 5 | 7 | 7 | 6 | 16 | 14 | 15 | 8 | 16 | 15 |
| Code group 57 | 5 | 7 | 9 | 10 | 7 | 11 | 6 | 12 | 9 | 12 | 11 | 8 | 8 | 6 | 10 |
| Code group 58 | 5 | 9 | 6 | 8 | 10 | 9 | 8 | 12 | 5 | 11 | 10 | 11 | 12 | 7 | 7 |
| Code group 59 | 5 | 10 | 10 | 12 | 8 | 11 | 9 | 7 | 8 | 9 | 5 | 12 | 6 | 7 | 6 |
| Code group 60 | 5 | 10 | 12 | 6 | 5 | 12 | 8 | 9 | 7 | 6 | 7 | 8 | 11 | 11 | 9 |
| Code group 61 | 5 | 13 | 15 | 15 | 14 | 8 | 6 | 7 | 16 | 8 | 7 | 13 | 14 | 5 | 16 |
| Code group 62 | 9 | 10 | 13 | 10 | 11 | 15 | 15 | 9 | 16 | 12 | 14 | 13 | 16 | 14 | 11 |
| Code group 63 | 9 | 11 | 12 | 15 | 12 | 9 | 13 | 13 | 11 | 14 | 10 | 16 | 15 | 14 | 16 |
| Code group 64 | 9 | 12 | 10 | 15 | 13 | 14 | 9 | 14 | 15 | 11 | 11 | 13 | 12 | 16 | 10 |

In step S1022, in order to reduce the amount of frame synchronization calculation, it is only required to acquire hashed values of code numbers of SSCs in any several consecutive timeslots, and the SSCs in five consecutive timeslots, which is marked as $C_P$, P=0, 1, 2, 3, 4, are taken as an optimal embodiment.

In step S1023, the code numbers of the SSCs in the five consecutive timeslots $C_P$, P=0, 1, 2, 3, 4 are recorded as $F_k=(C_k, C_{k+1}, C_{k+2})$ k=0, 1, 2 When k is equal to 0, a hash result is calculated using the hash formula according to three elements of $F_0$, i.e. $C_0$, $C_1$ and $C_2$ are substituted into the hash formula, and $D_{i,j}$, which is taken as $F_0$, is obtained by replacing $g_{i,j \cdot 3+0}$ with $C_0$, replacing $g_{i,j \cdot 3+1}$ with $C_1$, and replacing $g_{i,j \cdot 3+2}$ with $C_2$.

In step S1024, $F_0$ is compared with various elements in the lookup table D. If there is a value $D_{i,j}$ which is equal to $F_0$ in D, it is determined that the primary scrambling group number is i, $C_k$ actually represents the $(j \times 3)^{th}$ timeslot of one frame, and the scrambling code group identification and frame synchronization process is completed. If there is not a value which is equal to $F_0$ in D, turn to step S1025.

In step S1025, when the $D_{i,j}$ which is equal to $F_0$ is not found in D, return to step S1023, k=k+1 is brought into $F_k$, and then the hashed value $F_1$ is calculated. it is judged that whether or not there is a value $D_{i,j}$ which is equal to $F_1$ in the lookup table D; if yes, it is determined that the primary scrambling group number is i, $C_k$ actually represents the $(j \times 3+1)^{th}$ timeslot of one frame, and the scrambling code group identification and frame synchronization process is completed; if no, turn to step S1026.

In step S1026, return to step S1023, k=k+1 is brought into $F_k$, and then a hashed value $F_2$ is calculated, it is judged that whether there is a value $D_{i,j}$, which is equal to $F_2$, in the lookup table D; if yes, it is determined that the primary scrambling group number is i, $C_k$ actually represents the $(j \times 3+2)^{th}$ timeslot of one frame, and the scrambling code group identification and frame synchronization process is completed; if no, the scrambling code group identification and frame synchronization process is not completed, and the process fails and ends.

In step S103, the primary scrambling code is obtained in the primary scrambling code group according to the primary scrambling code group to which the primary scrambling code group belongs, so as to complete cell searching.

In the step, the obtained primary scrambling code group is used to obtain eight primary scrambling codes in the primary scrambling code group, the related detection is conducted on the CPICH channel to determine the primary scrambling code, so as to complete the process of cell searching.

Description is made with a particular embodiment below.

Timeslot synchronization is performed.

Code numbers C=(1, 13, 1, 5, 6) of the SSCs in five consecutive timeslots are acquired.

(1, 5, 6, 6, 14, 9, 10, 2, 13, 9, 2, 5, 14, 1, 13) represent the code numbers of the SSC corresponding to each of the timeslots of the eight scrambling code groups;

a table with 64×5 is obtained according to the following specific hash formula, wherein the hash formula is $$D_{i,j}=512 \cdot g_{i,j \cdot 3+0}+2 \cdot g_{i,j \cdot 3+1}+32 \cdot g_{i,j \cdot 3+2}, i=0, \ldots, 63, j=0, \ldots, 4;$$

where $D_{8,j}=(714, 3388, 5540, 4772, 7586)$

The coefficient of the hash formula is obtained by searching through a computer, and only one group is provided.

$F_0=570$ $F_1=6818$ $F_2=714$ are respectively calculated. it can be seen that when k=2, $F_2$ is equal to $D_{8,0}$, then the scrambling code group number is 8, and at the moment, the timeslot corresponding to $C_k$ is actually the $j \cdot 3^{th}$ timeslot in one frame, and j is 0 at the moment.

Accordingly the frame synchronization and scrambling code group identification process is determined.

The primary scrambling code is obtained in the primary scrambling code group according to the primary scrambling code group, so as to complete cell searching.

Figure 3:
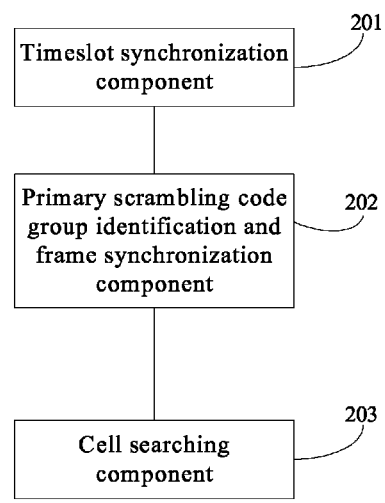
FIG. 3 is a structural schematic diagram of a device for searching a cell in an embodiment of the disclosure.

As shown in FIG. 3, one embodiment of the disclosure provides a device for searching a cell, wherein the device realizes the above-mentioned method and comprises:

a timeslot synchronization component 201, which is coupled to a primary scrambling code group identification and frame synchronization component, configured to perform timeslot synchronization;

the primary scrambling code group identification and frame synchronization component 202, which is coupled to a cell searching component, configured to identify a primary scrambling code group and perform frame synchronization according to hashed values of code numbers of SSCs in any several consecutive timeslots; and the cell searching component 203, which is coupled to the primary scrambling code group identification and frame synchronization component, configured to obtain a primary scrambling code in the identified primary scrambling code group according to the identified primary scrambling code group, so as to complete cell searching.

The timeslot synchronization component 201 uses a P-SCH to capture a primary synchronisation code by matching a peak value of a filtered output signal to determine a timeslot boundary, so as to complete timeslot synchronization.

The primary scrambling code group identification and frame synchronization component 202 is configured to:

obtain the code numbers of the SSCs in any five consecutive timeslots, which are marked as $C_P$, where P=0, 1, 2, 3, 4;

record the $C_P$, P=0, 1, 2, 3, 4 as $F_k=(C_k, C_{k+1}, C_{k+2})$ k=0, 1, 2, a hashed value $F_0$ when k=0 is calculated by a hash formula;

judge whether or not there is a value $D_{i,j}$ which is equal to $F_0$ in a lookup table D obtained in advance by calculating according to the hash formula; if yes, determine that the primary scrambling code group number is i, wherein $C_k$ actually represents the $(j \times 3)^{th}$ timeslot of one frame, so as to complete the scrambling code group identification and frame synchronization process; if no, calculate a hashed value $F_1$ when k=1 by the hash formula and further judge whether or not there is a value $D_{i,j}$ which is equal to $F_1$ in the lookup table D; if yes, determine that the primary scrambling code group number is i, wherein $C_k$ actually represents the $(j \times 3+1)^{th}$ timeslot of one frame, so as to complete the scrambling code group identification and frame synchronization process; if no, calculate a hashed value $F_2$ when k=2 by the hash formula and finally judge whether or not there is a value $D_{i,j}$ which is equal to $F_2$ in the lookup table D; if yes, determine that the primary scrambling code group number is i, wherein $C_k$ actually represents the $(j \times 3+2)^{th}$ timeslot of one frame, so as to complete the scrambling code group identification and frame synchronization process; and if no, end the flow.

The primary scrambling code group identification and frame synchronization component 202 is configured to divide the SSCs with 64 rows and 15 columns into 64×5 groups in a manner of dividing the columns into 5 groups by forming every three columns into one group, obtain a numerical value $D_{i,j}$ by calculating the SSC code numbers in each group according to the hash formula, and accordingly obtain the lookup table D with 64×5.

The hash formula is $$D_{i,j}=\alpha \cdot g_{i,j\cdot 3+0}+\beta \cdot g_{i,j\cdot 3+1}+\delta \cdot g_{i,j\cdot 3+2}, i=0, \ldots, 63, j=0, \ldots, 4;$$

where i represents the primary scrambling code group number in the table, j represents the $j^{th}$ hash in each primary scrambling code group, $g_{i,j\cdot 3+0}$ represents the code number of the SSC corresponding to the $j\cdot 3+0^{th}$ timeslot in the $i^{th}$ scrambling code group in the table, and α, β, and δ are coefficients.

It can be seen from the above-mentioned embodiments that in the disclosure, possible SSC code of each timeslot is determined, and then, a scrambling code group is searched for through a hash method, so that the problem of complex calculation and large storage in processes of frame synchronization and identification of a primary scrambling code group in cell searching in related technologies is solved, and the processes of identification of a scrambling code group and frame synchronization may be completed as long as hashed values of code numbers of SSCs of several consecutive timeslots are calculated; and the amount of related calculation is reduced by about two times, and the process of frame synchronization is accelerated.

Although for exemplary purposes, preferred embodiments of the disclosure are disclosed, a person skilled in the art will recognize that various improvements, increases and replacements are also possible, and therefore the scope of the disclosure should not be limited to the above-mentioned embodiments.

In summary, the method and device for searching the cell provided in the embodiments of the disclosure have the advantages as follows: the problem of complex calculation and large storage in processes of frame synchronization and identification of a primary scrambling code group in cell searching in related technologies is solved, and the processes of identification of a scrambling code group and frame synchronization can be completed as long as hashed values of code numbers of SSCs of several consecutive timeslots are calculated; and the amount of related calculation is reduced by about two times, and the process of frame synchronization is accelerated.

What is claimed is:

1. A method for searching a cell, which is applied to User Equipment (UE), comprising:
   performing time slot synchronization;
   identifying a primary scrambling code group and performing frame synchronization according to hashed values of code numbers of Secondary Synchronization Codes (SSCs) in any several consecutive timeslots; and
   obtaining a primary scrambling code in the primary scrambling code group according to the primary scrambling code group to complete cell searching.

2. The method for searching the cell according to claim 1, wherein a Primary Synchronization Code (P-SCH) is used for capturing the primary synchronisation code by matching a peak value of a filtered output signal to determine a timeslot boundary, so as to complete timeslot synchronization.

3. The method for searching the cell according to claim 2, wherein identifying the primary scrambling code group and performing frame synchronization according to the hashed values of code numbers of SSCs in any several consecutive timeslots comprises:
   obtaining the code numbers of the SSCs in any five consecutive timeslots, which are marked as $C_P$, P=0, 1, 2, 3, 4;
   recording the $C_P$, P=0, 1, 2, 3, 4 as $F_k=(C_k, C_{k+1}, C_{k+2})$ k=0, 1, 2, wherein when k=0, a hashed value $F_0$ is calculated according to a hash formula;
   judging whether or not there is a value $D_{i,j}$ which is equal to $F_0$ in a lookup table D obtained in advance by calculating according to the hash formula; if yes, determining that the primary scrambling code group number is i and $C_k$ actually represents the $(j\times 3)^{th}$ timeslot of one frame, so as to complete the scrambling code group identification and frame synchronization process; if no, calculating a hashed value $F_1$ when k=1 by the hash formula and further judging whether or not there is a value $D_{i,j}$ which is equal to $F_1$ in the lookup table D; if yes, determining that the primary scrambling code group number is i and $C_k$ actually represents the $(j\times 3+1)^{th}$ timeslot of one frame, so as to complete the scrambling code group identification and frame synchronization process; if no, calculating a hashed value $F_2$ when k=2 by the hash formula and finally judging whether or not there is a value $D_{i,j}$ which is equal to $F_2$ in the lookup table D; if yes, determining that the primary scrambling code group number is i and $C_k$ actually represents the $(j\times 3+2)^{th}$ timeslot of one frame, so as to complete the scrambling code group identification and frame synchronization process; and if no, ending a flow.

4. The method for searching the cell according to claim 1, wherein identifying the primary scrambling code group and performing frame synchronization according to the hashed values of code numbers of SSCs in any several consecutive timeslots comprises:
   obtaining code numbers of the SSCs in any five consecutive timeslots, which are marked as $C_P$, P=0, 1, 2, 3, 4;
   recording the $C_P$, P=0, 1, 2, 3, 4 as $F_k=(C_k, C_{k+1}, C_{k+2})$ k=0, 1, 2, wherein when k=0, a hashed value $F_0$ is calculated according to a hash formula;
   judging whether or not there is a value $D_{i,j}$ which is equal to $F_0$ in a lookup table D obtained in advance by calculating according to the hash formula; if yes, determining that the primary scrambling code group number is i and $C_k$ actually represents the $(j\times 3)^{th}$ timeslot of one frame, so as to complete the scrambling code group identification and frame synchronization process; if no, calculating a hashed value $F_1$ when k=1 by the hash formula and further judging whether or not there is a value $D_{i,j}$ which is equal to $F_1$ in the lookup table D; if yes, determining that the primary scrambling code group number is i and $C_k$ actually represents the $(j\times 3+1)^{th}$ timeslot of one frame, so as to complete the scrambling code group identification and frame synchronization process; if no, calculating a hashed value $F_2$ when k=2 by the hash formula and finally judging whether or not there is a value $D_{i,j}$ which is equal to $F_2$ in the lookup table D; if yes, determining that the primary scrambling code group number is i and $C_k$ actually represents the $(j\times 3+2)^{th}$ timeslot of one frame, so as to complete the scrambling code group identification and frame synchronization process; and if no, ending a flow.

5. The method for searching the cell according to claim 4, wherein obtaining the lookup table D in advance by calculating according to the hash formula comprises:
   dividing the SSCs in 64 rows and 15 columns into 64×5 groups in a manner of dividing the columns into 5 groups by forming every three columns into one group, obtaining a numerical value $D_{i,j}$ by calculating the code numbers of SSCs in each group according to the hash formula, and accordingly obtaining a lookup table D with 64×5.

6. The method for searching the cell according to claim 4, wherein the hash formula is:

$$D_{i,j} = \alpha \cdot g_{i,j \cdot 3+0} + \beta \cdot g_{i,j \cdot 3+1} + \delta \cdot g_{i,j \cdot 3+2}, i=0, \ldots, 63, j=0, \ldots, 4;$$

where i represents the primary scrambling code group number in the table, j represents the $j^{th}$ hash in each primary scrambling code group, $g_{i,j \cdot 3+0}$ represents the code number of the SSC corresponding to the $j \cdot 3+0^{th}$ timeslot in the $i^{th}$ scrambling code group in the table, and $\alpha$, $\beta$, and $\delta$ are coefficients.

7. A device for searching a cell, which is located in User Equipment (UE), comprising:
   a timeslot synchronization component, which is coupled to a primary scrambling code group identification and frame synchronization component, configured to perform timeslot synchronization;
   the primary scrambling code group identification and frame synchronization component, which is coupled to a cell searching component, configured to identify a primary scrambling code group and perform frame synchronization according to hashed values of code numbers of secondary synchronization codes (SSCs) in any several consecutive timeslots; and
   the cell searching component, which is coupled to the primary scrambling code group identification and frame synchronization component, configured to obtain a primary scrambling code in the primary scrambling code group according to the primary scrambling code group to complete cell searching.

8. The device for searching the cell according to claim 7, wherein the timeslot synchronization component uses a Primary Synchronization Code (P-SCH) to capture a primary synchronisation code by matching a peak value of a filtered output signal to determine a timeslot boundary, so as to complete timeslot synchronization.

9. The device for searching the cell according to claim 8, wherein the primary scrambling code group identification and frame synchronization component is configured to
   obtain code numbers of the SSCs in any five consecutive timeslots, which are marked as $C_P$, P=0, 1, 2, 3, 4;
   record the $C_P$, P=0, 1, 2, 3, 4 as $F_k = (C_k, C_{k+1}, C_{k+2})$ k=0, 1, 2, wherein when k=0, a hashed value $F_0$ is calculated according to a hash formula; and
   judge whether or not there is a value $D_{i,j}$ which is equal to $F_0$ in a lookup table D obtained in advance by calculating according to the hash formula; if yes, determine that the primary scrambling code group number is i, wherein $C_k$ actually represents the $(j \times 3)^{th}$ timeslot of one frame, so as to complete the scrambling code group identification and frame synchronization process; if no, calculate a hashed value $F_1$ when k=1 by the hash formula and further judge whether or not there is a value $D_{i,j}$ which is equal to $F_1$ in the lookup table D; if yes, determine that the primary scrambling code group number is i, wherein $C_k$ actually represents the $(j \times 3+1)^{th}$ timeslot of one frame, so as to complete the scrambling code group identification and frame synchronization process; if no, calculate a hashed value $F_2$ when k=2 by the hash formula and finally judging whether or not there is a value $D_{i,j}$ which is equal to $F_2$ in the lookup table D; if yes, determine that the primary scrambling code group number is i, wherein $C_k$ actually represents the $(j \times 3+2)^{th}$ timeslot of one frame, so as to complete the scrambling code group identification and frame synchronization process; if no, end the flow.

10. The device for searching the cell according to claim 7, wherein the primary scrambling code group identification and frame synchronization component is configured to
    obtain code numbers of the SSCs in any five consecutive timeslots, which are marked as $C_P$, P=0, 1, 2, 3, 4;
    record the $C_P$, P=0, 1, 2, 3, 4 as $F_k = (C_k, C_{k+1}, C_{k+2})$ k=0, 1, 2, wherein when k=0, a hashed value $F_0$ is calculated according to a hash formula; and
    judge whether or not there is a value $D_{i,j}$ which is equal to $F_0$ in a lookup table D obtained in advance by calculating according to the hash formula; if yes, determine that the primary scrambling code group number is i, wherein $C_k$ actually represents the $(j \times 3)^{th}$ timeslot of one frame, so as to complete the scrambling code group identification and frame synchronization process; if no, calculate a hashed value $F_1$ when k=1 by the hash formula and further judge whether or not there is a value $D_{i,j}$ which is equal to $F_1$ in the lookup table D; if yes, determine that the primary scrambling code group number is i, wherein $C_k$ actually represents the $(j \times 3+1)^{th}$ timeslot of one frame, so as to complete the scrambling code group identification and frame synchronization process; if no, calculate a hashed value $F_2$ when k=2 by the hash formula and finally judging whether or not there is a value $D_{i,j}$ which is equal to $F_2$ in the lookup table D; if yes, determine that the primary scrambling code group number is i, wherein $C_k$ actually represents the $(j \times 3+2)^{th}$ timeslot of one frame, so as to complete the scrambling code group identification and frame synchronization process; if no, end the flow.

11. The device for searching the cell according to claim 10, wherein the primary scrambling code group identification and frame synchronization component is configured to
    divide the SSCs in 64 rows and 15 columns into 64×5 groups in a manner of dividing the columns into 5 groups by forming every three columns into one group, obtain a numerical value $D_{i,j}$ by calculating the SSC code numbers in each group according to the hash formula, and accordingly obtain the lookup table D with 64×5.

12. The device for searching the cell according to claim 10, wherein the hash formula is $$D_{i,j} = \alpha \cdot g_{i,j \cdot 3+} + \beta \cdot g_{i,j \cdot 3+1} + \delta \cdot g_{i,j \cdot 3+2}, i=0, \ldots, 63, j=0, \ldots, 4;$$

where i represents the primary scrambling code group number in the table, j represents the $j^{th}$ hash in each primary scrambling code group, $g_{i,j \cdot 3+0}$ represents the code number of the SSC corresponding to the $j \cdot 3+0^{th}$ timeslot in the $i^{th}$ scrambling code group in the table, and $\alpha$, $\beta$, and $\delta$ are coefficients.

* * * * *